(12) United States Patent
Blumberg

(10) Patent No.: US 9,098,198 B2
(45) Date of Patent: Aug. 4, 2015

(54) SPEED TYPING APPARATUS

(71) Applicant: Marvin Blumberg, Bethesda, MD (US)

(72) Inventor: Marvin Blumberg, Bethesda, MD (US)

(*) Notice: Subject to any disclaimer, the term of this patent is extended or adjusted under 35 U.S.C. 154(b) by 0 days.

(21) Appl. No.: 14/096,598

(22) Filed: Dec. 4, 2013

(65) Prior Publication Data

US 2014/0161503 A1    Jun. 12, 2014

Related U.S. Application Data

(60) Provisional application No. 61/736,233, filed on Dec. 12, 2012, provisional application No. 61/772,773, filed on Mar. 5, 2013.

(51) Int. Cl.
| | |
|---|---|
| *B41J 5/10* | (2006.01) |
| *G06F 3/0488* | (2013.01) |
| *G06F 3/023* | (2006.01) |
| *B41J 5/28* | (2006.01) |
| *G06F 3/02* | (2006.01) |

(52) U.S. Cl.
CPC .......... *G06F 3/04886* (2013.01); *G06F 3/0238* (2013.01); *B41J 5/10* (2013.01); *B41J 5/28* (2013.01); *G06F 3/02* (2013.01); *G06F 3/0219* (2013.01)

(58) Field of Classification Search
USPC ........................................ 400/485
See application file for complete search history.

(56) References Cited

U.S. PATENT DOCUMENTS

| | | | | |
|---|---|---|---|---|
| 4,924,431 A | * | 5/1990 | Lapeyre | ........................ 708/146 |
| 5,062,070 A | * | 10/1991 | Lapeyre | ........................ 708/146 |
| 5,664,896 A | | 9/1997 | Blumberg | |
| 6,102,594 A | | 8/2000 | Strøm | |
| 6,348,878 B1 | | 2/2002 | Tsubai | |
| 6,799,303 B2 | | 9/2004 | Blumberg | |
| 7,081,837 B2 | * | 7/2006 | Bollman | ........................ 341/22 |
| 7,310,053 B2 | * | 12/2007 | Bollman | ........................ 341/22 |
| 7,439,959 B2 | * | 10/2008 | Griffin et al. | ................. 400/472 |
| 7,506,252 B2 | | 3/2009 | Blumberg | |
| 7,561,685 B2 | * | 7/2009 | Griffin | ........................ 400/472 |
| 7,626,516 B2 | | 12/2009 | Griffin et al. | |
| 8,072,355 B2 | | 12/2011 | Griffin et al. | |
| RE43,082 E | | 1/2012 | Gutowitz | |
| 8,194,041 B2 | | 6/2012 | Cebe | |
| 8,451,595 B2 | | 5/2013 | Leung et al. | |
| 8,462,123 B1 | | 6/2013 | Sears | |
| 2003/0038735 A1 | | 2/2003 | Blumberg | |
| 2004/0070522 A1 | | 4/2004 | Tsubai et al. | |
| 2004/0168131 A1 | | 8/2004 | Blumberg | |
| 2009/0079702 A1 | | 3/2009 | Colley | |
| 2011/0248924 A1 | | 10/2011 | Bhattacharjee | |
| 2011/0310042 A1 | | 12/2011 | Breuer | |
| 2012/0062465 A1 | | 3/2012 | Spetalnick | |
| 2012/0189368 A1 | | 7/2012 | Jawerth et al. | |
| 2012/0212419 A1 | | 8/2012 | Griffin et al. | |

OTHER PUBLICATIONS

International Search Report and Written Opinion; PCT/US2013/073067; Apr. 22, 2014.

* cited by examiner

*Primary Examiner* — Jill Culler

(74) *Attorney, Agent, or Firm* — Studebaker & Brackett PC

(57) ABSTRACT

A keyboard is provided having 26 letters assigned to only 17 to 21 keys, and preferably 21 keys. This advantageous system of typing makes use of either one or two hands. The 26 letters of the English alphabet are all displayed. Five keys have two letters—those letters are PQ, JK, UW, VX and YZ for a total of ten letters. Sixteen keys have one letter assigned to each key—namely the letters A, B, C, D, E, F, G, H, I, L, M, O, N, R, S and T for a total of sixteen letters assigned to a specific key—for a total of 26 letters.

11 Claims, 5 Drawing Sheets

Column
|   | 1 | 2 | 3 | 4 | 5 | 6 | 7 |
|---|---|---|---|---|---|---|---|
| Row 1 |   | C | A | B |   |   |   |
| 2 |   | D | E | F — 24 |   |   |   |
| 3 | JK | G | I | H — 26 |   |   |   |
| 4 | L | M | O | N — 30 |   |   |   |
| 5 | PQ | R | S | T — 32 |   |   |   |
| 6 |   | VX | UW | YZ — 34 |   |   |   |
| 7 |   |   |   |   |   |   |   |

Fig. 1

Column
|   | 1 | 2 | 3 | 4 | 5 | 6 | 7 |
|---|---|---|---|---|---|---|---|
| Row 1 |   | B | D | G |   |   |   |
| 2 |   | A | E | I |   |   |   |
| 3 |   | C | F | H — 48 |   |   |   |
| 4 | YZ | JK | L | M — 50 |   |   |   |
| 5 | VX | N | O | PQ — 52 |   |   |   |
| 6 | UW | R | S | T — 54 |   |   |   |
| 7 |   |   |   |   |   |   |   |

| Column | 1 | 2 | 3 | 4 | 5 | 6 | 7 |
|---|---|---|---|---|---|---|---|
| Row 1 | | VX | UW | YZ | | | |
| 2 | | C | A | B | | | |
| 3 | | D | E | F | | | |
| 4 | JK | G | I | H | | | |
| 5 | L | M | O | N | | | |
| 6 | PQ | R | S | T | | | |
| 7 | | | | | | | |

Fig. 4

| Column | 1 | 2 | 3 | 4 | 5 | 6 | 7 |
|---|---|---|---|---|---|---|---|
| Row 1 | YZ | C | A | B | | | |
| 2 | VX | D | E | F | | | |
| 3 | UW | G | I | H | | | |
| 4 | JK | L | MO | N | | | |
| 5 | PQ | R | S | T | | | |
| 6 | | | | | | | |
| 7 | | | | | | | |

| Column | 1 | 2 | 3 | 4 | 5 | 6 | 7 |
|---|---|---|---|---|---|---|---|
| Row 1 | 136 | C | AB — 130 | | | | |
| 2 | | D | EF — 132 | | | | |
| 3 | JK | G | HI — 134 | | | | |
| 4 | L | N | MO — 138 | | | | |
| 5 | PQ — 144 | R | S | T — 140 | | | |
| 6 | | VX | UW | YZ — 142 | | | |
| 7 | | | | | | | |

| Column | 1 | 2 | 3 | 4 | 5 | 6 | 7 |
|---|---|---|---|---|---|---|---|
| Row 1 | L | MO — 148 | N | PQ — 150 | | | |
| 2 | C | O | G | R | | | |
| 3 | A | E | HI | TU | | | |
| 4 | B | F | JK | S | | | |
| 5 | 158 | V | WX | YZ — 152 | | | |
| 6 | | 160 | | | | | |
| 7 | | | | | | | |

SPEED TYPING APPARATUS

CROSS REFERENCE TO RELATED APPLICATIONS

This application claims benefit of priority to U.S. Patent Provisional Application No. 61/736,233, filed Dec. 12, 2012, and U.S. Patent Provisional Application No. 61/772,773, filed Mar. 5, 2013, the entire content of which is incorporated herein by reference.

FIELD OF THE INVENTION

The present invention is directed to a keyboard configurable into different arrangements around a core grouping of keys and letters.

BACKGROUND OF THE INVENTION

With the advent of electronic keyboards, such as those found on smart phone devices, it is possible to arrange a keyboard into any configuration. However, presently, keyboard configurations are usually found to be in a QWERTY configuration or in an alphabetical configuration. These types of configurations are not necessarily advantageous for learning an order of keys and for typing. Accordingly, there is a need for an adaptable keyboard which is easily learned and arranged in any desired configuration.

SUMMARY OF THE INVENTION

By the present invention, a keyboard is provided having 26 letters assigned to only 17 to 21 keys, and preferably 21 keys. This advantageous system of typing makes use of either one or two hands. The 26 letters of the English alphabet are all displayed. Five keys have two letters—those letters are PQ, JK, UW, VX and YZ for a total of ten letters. Sixteen keys have one letter assigned to each key—namely the letters A, B, C, D, E, F, G, H, I, L, M, O, N, R, S and T for a total of sixteen letters assigned to a specific key—for a total of 26 letters.

Preferably, in one embodiment, the letters M and O are assigned to one key. A total of five groups of letters are assigned with two letters per key for a total of ten letters.

The preferred keyboards have a "core grouping" of nine letters, which usually have only one letter per key. The letters in the core grouping are in alphabetical order, within each group, although the specific arrangement of the three letters in each group may not be consecutive.

The core grouping with each of three sets of three groups of alphabetical letters abut an adjacent group of keys on at least one side which are also assigned letters which are in alphabetical order. For example, a core grouping consisting of nine letters may be A, B, C, D, E, F, G, H and I which are assigned to nine keys (one letter per key). The surrounding keys of additional groups are in adjacent columns and/or rows.

The letters R, S and T are immediately located adjacent to the core grouping. This arrangement assists the user to recall the location and the letters within the core grouping and the letters and keys surrounding the core grouping.

Six of the double lettered keys are JK, MO, PQ, UW, VX, YZ (for example, a total of twelve letters). The remaining 14 letters are each assigned to a single key for a twenty key keyboard. This alphabetical arrangement of the nine letter core grouping can be viewed by the typist as the hub or the core of the letter arrangement with the letter "E" at the middle of the "core grouping." The nine letters of the "hub" or core in alphabetical order should be the user's main means of practicing the letters in the hub and the letters surrounding the hub or core grouping.

The letters of the three groups of the core grouping may be ABC, DEF and GHI. These are the first letters of the English alphabet. The letters J, K and L are assigned in a next group of keys which then lead to the next group of three letters, M, O and N. Then there is an arrangement of the two letters PQ to a single key and then the assignment of three letters to a group of three keys with the letters R, S and T. Then the keyboard includes two letters per key for the letters UW, VX and YZ.

The nine keys of the core grouping account for approximately 50% of typing letter input, but within a space of ⅓ of a normal QWERTY keyboard. From the core grouping area, the user reaches out to contact the additionally needed keys.

The alphabetical order of the letters enable the user to memorize the keyboard more quickly and to practice typing and exercising the memory without looking at the letters on the key. The end result is a more expedient "touch" system learning process, enabling the user to type more efficiently. Also, the location of the assigned letters, as shown, results in a short movement required to press the desired key and the input can be faster.

The 26 letters of the alphabet are presented in three major groups. The initial first group of nine letters which are presented as three groups of three letters with each of the groups of letters including the alphabetical groups ABC, DEF and GHI, but not necessarily in alphabetical order within each single group. For example, the group including A, B and C may be presented as C, A, B. Everyone knows these three groups by knowing the alphabet. In this system one may learn how to type quickly and easily which is possible because it makes use of the knowledge already known to the person. The person already knows these three groups.

That person already knows the rest of the order of the 26 letters of the alphabet which includes knowing that after the letters G, H, I the next letters are J, K, L, then M, O, N, then PQ, R, ST, which is followed by UW, VW, YZ. The first nine letters ABC, DEF and GHI lead to the second group of letters (1) MON, (2) RST, and (3) UV, WX and YZ. A third group of letters, the "transition group" includes JK, L and PQ.

The keyboards of the present invention use less than 26 keys to enter the 26 letters of the English alphabet. The keyboards presented have from 17 to 21 keys to which the letters are assigned. Most of the keyboards presented have 21 keys to which the 26 letters are assigned. In one embodiment, 14 keys are assigned one letter (a total of 14 letters). Six keys are assigned two letters for a total of 12 letters. Thus all 26 letters of the English alphabet are assigned to just 20 keys (6+14=20).

My prior patents U.S. Pat. No. 7,506,252, entitled "Speed typing apparatus for entering letters of alphabet with at least thirteen-letter input elements," U.S. Pat. No. 6,799,303, entitled "Speed typing apparatus and method," and U.S. Pat. No. 5,664,896, entitled "Speed Typing Apparatus and Method," hereby incorporated in their entirety by reference lists the number of unintended words for each combination of letters. For the two letter combinations: JK: 1; MO: 11; PQ: 0; UW: 4; VX: 2; YZ: 1; totaling 19 words in a dictionary of approximately 24,000 words being unintentionally formed by the wrong letter at the beginning of a word. This is a very low incidence. These combinations are also chosen because they assist in forming an alphabetical letter arrangement and at the same time achieve the goal of only using 17 to 21 keys.

In one embodiment, the alphabetical order is easy to recall. The user is given the letter A in a position easy to recall because it is located in the middle of the top row. The letter "B" follows immediately in the next space to the right and then the letter "C" is located to the left of the "A" which completes the first of three alphabetical letters. The next three letter alphabetical group is the three letters DEF. Then in perfect alphabetical order in the next row down is the group of GHI, then in the next row down the group of MON, and then in the next row down the group of RST.

In a preferred embodiment, a 21 key keyboard is disclosed. The "core grouping" consists of nine keys in rows 1, 2 and 3 between columns 2, 3 and 4. Row 1 is assigned the letter "A" in column 3, row 1 is assigned the letter "B" in column 4, row 1 is assigned the letter "C" in column 2, row 2 is assigned the letter E in column 3, row 2 is assigned the letter "F" in column 4, and row 2 is assigned the letter "D" in column 2.

As noted above the alphabet begins with the letter "A" in the center of Row 1 and the vowels continue with the letter "E" in the center of Row 2 and the letter "I" is located in the center of Row 3. The user can see the uniformity of the letter locations with the vowels A, E and I centrally located in each row in each group of the three groups of the core grouping.

Rows 1, 2 and 3, each contain three letters shown in a way that the user can enter the letters in the alphabetical order of the letters. The 26 letters of the English alphabet are assigned to only 21 keys. The number of keys required is reduced by the assignment of two letters to five keys for a total of 10 letters and 16 letters are assigned to a total of 16 keys to which only one letter is assigned to each key. Thus 26 letters are assigned to 21 keys.

If the letters "M" and "O" were assigned to one key and all the other letter assignments remained, a 20 key keyboard would be disclosed. In the 21 key keyboard, the vowels A, E, I are assigned in successive rows 1, 2 and 3 (or alternately in successive columns, dependent on the orientation of the keyboard).

It is noted that the user can practice the entry of the 26 letters in the English alphabet in alphabetical order. Since there are five through nine keys with two letter assignments, only six strokes of these keys can result in the entry of 12 letters in one example, and only 14 strokes are needed to enter the 14 letters assigned one letter per key. Therefore, the entire 26 letter alphabet can be entered using only 20 strokes in this example. Of course, additional or fewer keys can be assigned two letters per key resulting in keyboards of 17 to 21 keys in total.

The important factor is the ability to remember the location of the keys. Therefore, the alphabetical arrangement of successive letters in groups is more important than the number of letters per key provided all of the keys are easy to reach. Twenty one keys may make for faster typing than eight keys. Some possible two letter combinations are UW, VX, YZ, JK, MO and PQ for use in either a 20 or 21 key keyboard.

The transition letters in a transition group provide for ease of access of additional letters and recall of the order of letters from the middle or home row of the three groups of three alphabetical letters where the user can reach every key. A transition group verifies the user can reach the desired key on the keyboard for a keyboard with 21 keys. Each key can be reached from corner to corner when the user's fingers are on the home line and little finger is pressing the key on an outermost column.

A 21 key preferred keyboard can serve as a platform from which the other keyboards are derived by changing letters in the grid. For example, only the letter E and F can be exchanged. The user may select a desired keyboard based upon a perception regarding the use of input and the likelihood of error. This may be accomplished by the use of an electronic keypad which may be revised according to the user's wishes. Variation on locations of the various groups of letters may be easily accommodated and accomplished. A variable keyboard is considered within the scope of the invention.

The user may also desire the program to add or delete letters from each key and to add to or delete rows from the memory of the device. The user can also input the command to delete the memory of the letters assigned to each key and substitute other letters. The limitation is that there are at least 17 keys and at most 21 keys. The user may want to use mnemonic phrases to memorize the order of the letters in each group.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is a layout of a preferred keyboard according to the present invention.

FIG. 2 is an alternate arrangement of groups of keys forming an alternate embodiment.

FIG. 3 is an alternate arrangement of groups of keys forming an alternate embodiment.

FIG. 4 is an alternate arrangement of groups of keys forming an alternate embodiment.

FIG. 5 is an alternate arrangement of groups of keys forming an alternate embodiment.

FIG. 6 is an alternate arrangement of groups of keys forming an alternate embodiment.

FIG. 7 is an alternate arrangement of groups of keys forming an alternate embodiment.

FIG. 8 is an alternate arrangement of groups of keys forming an alternate embodiment.

FIG. 9 is an alternate arrangement of groups of keys forming an alternate embodiment.

FIG. 10 is an alternate arrangement of groups of keys forming an alternate embodiment.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In FIG. 1, a keyboard 20 is shown. The keyboard includes three core groups 22, 24, 26. Each core group includes three successive letters from the alphabet, but not necessarily in alphabetical order. The three core groups 22, 24, 26 form the core grouping 28 of the invention. These nine letters, in combination, facilitate a keyboard easy to learn and quick to use.

In the first group 22, for example, the letters A, B and C are present but not necessarily in that order. Successively, group 24 includes the letters D, E and F, but not necessarily in that order. Similarly, group 26 includes the letters G, H and I but not necessarily in that order. These three groups of letters forming the core grouping, are surrounded by additional groups of letters. The layout of the groups of the core grouping as well as the surrounding groups of letters is dictated by the personal preference of the individual. This is easily accomplished by the use of an electronic keyboard where the individual may control placement of the groups of letters.

Of importance, is that in the core grouping 28, the vowels A, E and I are aligned in a column. However, it is understood as being within the scope of the present invention that the three vowels A, E and I may be aligned vertically, horizontally or diagonally. It has been found that this arrangement of vowels is advantageous in learning and using a keyboard. It is also possible, as shown in group 32 to include a fourth vowel in alignment with the vowels A, E and I.

Group 30 includes the letters MNO. It is also noted from the arrangement of groups 32 and 34, particularly with respect to group 34, that the vowel U is also in alignment with the four vowels A, E, I and O. This is particularly advantageous for typing. The individual will always know where the vowels are located.

Group of letters 36 is referred to as the "transition group". This is because the letters included in transition group 36 provide an introduction to the adjacent group of letters found in groups 26, 30 and 32. As seen in FIG. 1, the letters J and K are located on a single key and form part of the alphabetical group G, H, I, J and K from groups 26 and 36. Similarly, the letter L of group 36 is aligned with group 30 having the successive letters M, N and O. Also, the single key having the letters P and Q in group 36 is aligned with the successive alphabetical letters R, S and T in group 32.

In the embodiment of FIG. 1, 21 keys are used to the individual's advantage. This requires that five keys include two letters each and 16 keys include a single letter. As seen by the other embodiments in the other figures, alternate arrangements of groups and letters in each group are possible for a preferred range of total keys of 17 to 21 keys. In the figures, the grouping of multiple letters in a single box of the grid represents a single typing key having two letters. The use of multiple letters on a single key is explained with reference to my three patents, previously mentioned, and hereby incorporated in their entirety by reference.

Figures 9, 10:
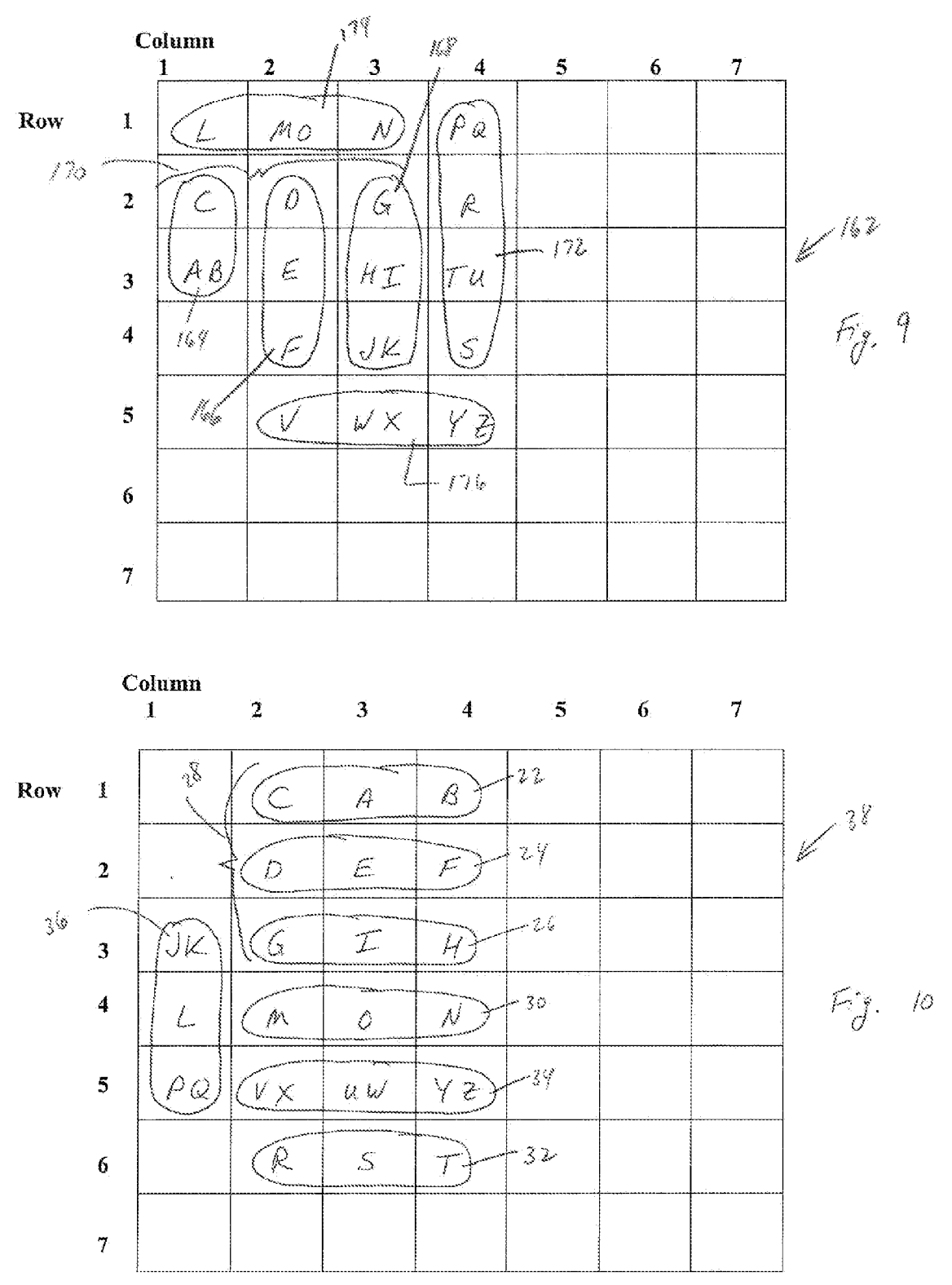

An alternate arrangement of FIG. 1 is shown in FIG. 10 where the keyboard 38 includes the same grouping of letters 22, 24, 26, 30, 32, 34 and 36, but in this arrangement, the groups of letters 32 and 34 have been reversed in position, while more directly aligning the series of vowels A, E, I, O and U in direct successive contiguous alignment. Of significance is the alignment of the vowels A, E and I in the core grouping 28 so that at least three vowels are in alignment. However, as noted from the alternate embodiments, it is also possible to have four or five vowels in alignment. Beyond the core grouping 28, the alignment of the vowels are according to personal preference.

With reference to FIG. 2, keyboard 40 includes similar groups of letters with groups 42, 44 and 46 forming the core grouping 48. In this arrangement the vowels A, E and I are arranged horizontally. Arranged around the core grouping are additional groups of letters 50, 52, 54 and 56. This arrangement of groups of letters is an alternate 21 key keyboard.

In FIG. 3, another 21 key keyboard 58 made of seven groups includes the core groups 60, 62 and 64 forming the core grouping 66 with the vowels A, E and I arranged vertically. Additional groups 68, 70 and 72 are positioned above and below the core grouping 66. Transition group 72 is positioned adjacent to core group 64 and additional groups 68 and 70. In this keyboard, the four vowels A, E, I and O are arranged consecutively in a vertical column.

In keyboard 74 shown in FIG. 4, the core groups 76, 78 and 80 form the core grouping 82 with the vowels A, E and I aligned in a vertical column. Additional group 84 adds the successive arrangement of the vowel O to the aligned vowels A, E and I. In this arrangement, additional groups 86 and 88 are aligned below and to the side of the core grouping 82. Transition group 90 only includes two keys with two letters on each key.

Figures 5, 6:
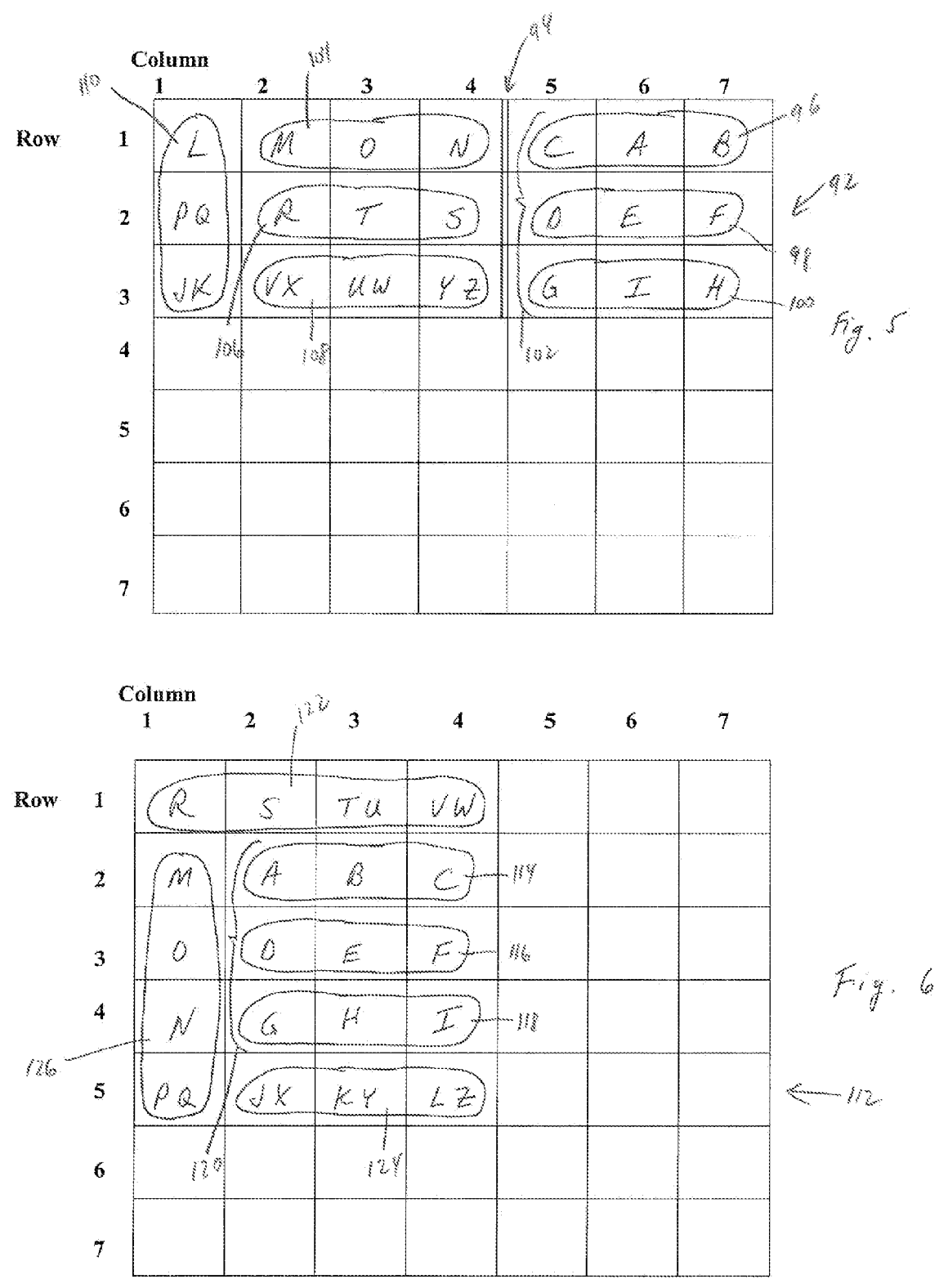

In FIG. 5, keyboard 92 is shown. In this keyboard, the keyboard is arranged as a two-handed keyboard as indicated by separation line 94 consisting of two parallel lines. On the right-hand portion of the keyboard, core groups 96, 98 and 100 are located forming core grouping 102. On the left-hand side of the keyboard are groups 104, 106 and 108 with transition group 110 being located on a side of the groups 104, 106 and 108. This is also a 21 key keyboard.

In FIG. 6, keyboard 112 is shown. In this keyboard, core groups 114, 116 and 118 form core grouping 120. It is noted that in this embodiment, the vowels A, E and I are arranged diagonally. Located above the core grouping is group 122 and below the core grouping is group 124. Arranged to the sides of core grouping 120 is group 124 and group 126.

In FIG. 7, keyboard 128 is an example of a 17 key keyboard. Core groups 130, 132 and 134 form core grouping 136. In the groups of the core grouping, only two keys are used with one of the two keys having two letters. However, the alignment of the vowels A, E and I is still present, aligned in a vertical column. Additional groups 138, 140 and 142 are present. Transition group 144 is aligned along the sides of groups 134, 138 and 140.

In FIG. 8, keyboard 146 illustrates a 19 key keyboard with core groups 148, 150, 152 forming core grouping 154. In this arrangement, in combination with additional group 156, the vowels A, E, I and U are aligned horizontally. Additional groups 158 and 160 are also present.

In FIG. 9, keyboard 162 is representative of an 18 key keyboard. In this keyboard, core groups 164, 166 and 168 form core grouping 170. Vowels A, E and I are aligned along with the vowel U found in adjacent group 172. In this arrangement, there are six groups of keys with additional groups 174 and 176 completing the alphabet.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A keyboard containing a plurality of letters on a pattern of keys, said keyboard comprising
    at least 19 and at most 21 keys, the keys being letter keys and including all letters of an alphabet, each of the letter keys including a representation of an alphabetical character and representing said alphabetical character when pressed,
    the keys being arranged in a core grouping including three groups of keys, with each of the three groups including an arrangement of three letters containing a set of alphabetically consecutive letters, the three letters in each group being included on a plurality of keys aligned in a row or a column,
    the three groups of the core grouping including the letters (1) A, B, and C, (2) D, E, and F, and (3) G, H, and I, in each group respectively, each of the three groups including three keys with one letter per key,
    at least three additional groups of letters, the additional groups of letters being arranged contiguously with respect to the core grouping and each other,
    the at least three additional groups of letters each include at least three letters on at least three keys with at least one letter per key, the at least three additional groups of letters being successively positioned adjacent to each other.

2. The keyboard of claim 1, wherein vowels from each of the three groups are aligned.

3. The keyboard of claim 2, wherein the alignment of the vowels is horizontally, vertically or diagonally.

4. The keyboard of claim 2, wherein vowels from four groups of letters are aligned.

5. The keyboard of claim 1, wherein the alphabet is in the English language and includes 26 letters.

6. The keyboard of claim 1, wherein the vowels A, E and O are aligned consecutively between the three groups.

7. The keyboard of claim 1, wherein there are five rows of keys.

8. A keyboard containing a plurality of letters on a pattern of keys, said variable keyboard comprising
21 keys, the keys being letter keys and including all letters of an alphabet, each of the letter keys including a representation of an alphabetical character and representing said alphabetical character when pressed,
the keys being arranged in a core grouping including three groups of keys, with each of the three groups including an arrangement of three letters containing a set of alphabetically consecutive letters, the vowels A, E and 1 being aligned consecutively between the three groups, a plurality of letters in each group being included on a plurality of keys aligned in a row or a column,
the three groups of the core grouping including the letters (1) A, B, and C, (2) D, E, and F, and (3) G, H, and I, in each group respectively, each of the three groups including three keys with one letter per key,
at least three additional groups of letters, the additional groups of letters being arranged contiguously with respect to the core grouping and each other,
the at least three additional groups of letters each include at least three letters on at least three keys with at least one letter per key,
the at least three additional groups of letters being successively positioned adjacent to each other.

9. The keyboard of claim 8, wherein there are four additional groups of letters.

10. The keyboard of claim 8, wherein the alphabet is in the English language and includes 26 letters.

11. The keyboard of claim 8, wherein there are five rows of keys.

* * * * *